(12) United States Patent
Rohaly et al.

(10) Patent No.: US 10,965,854 B2
(45) Date of Patent: *Mar. 30, 2021

(54) SURFACE TOPOGRAPHY MEASUREMENT SYSTEMS

(71) Applicant: GelSight, Inc., Waltham, MA (US)

(72) Inventors: Janos Rohaly, Concord, MA (US); Edward H. Adelson, Winchester, MA (US)

(73) Assignee: GelSight, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,187

(22) Filed: Sep. 6, 2019

(65) Prior Publication Data

US 2019/0394372 A1 Dec. 26, 2019

Related U.S. Application Data

(63) Continuation of application No. 16/563,187, filed on Sep. 4, 2019, which is a continuation of application No. PCT/US2018/021217, filed on Mar. 6, 2018.

(Continued)

(51) Int. Cl.
*H04N 5/225* (2006.01)
*G01B 11/30* (2006.01)
(Continued)

(52) U.S. Cl.
CPC .......... *H04N 5/2256* (2013.01); *G01B 11/24* (2013.01); *G01B 11/303* (2013.01); *G02B 7/022* (2013.01); *H04N 5/2254* (2013.01); *G01B 11/30* (2013.01)

(58) Field of Classification Search
None
See application file for complete search history.

(56) References Cited

U.S. PATENT DOCUMENTS 5,459,329 A * 10/1995 Sinclair .................. G09B 25/06
250/341.8
5,757,486 A * 5/1998 Marcus ................ G01B 11/026
348/E17.002

(Continued)

FOREIGN PATENT DOCUMENTS

EP 0690301 1/1996
RU 2582497 4/2016

(Continued)

OTHER PUBLICATIONS

WIPO, "PCT Application No. PCT/US18/21217 International Preliminary Report on Patentability dated Sep. 19, 2019", 5 pages.

(Continued)

*Primary Examiner* — Reza Aghevli
(74) *Attorney, Agent, or Firm* — Strategic Patents, P.C.

(57) ABSTRACT

A topographical measurement system uses an imaging cartridge formed of a rigid optical element and a clear, elastomeric sensing surface configured to capture high-resolution topographical data from a measurement surface. The imaging cartridge may be configured as a removable cartridge for the system so that the imaging cartridge, including the rigid optical element and elastomeric sensing surface can be removed and replaced as a single, integral component that is robust/stable over multiple uses, and easily user-replaceable as frequently as necessary or desired. The cartridge may also usefully incorporate a number of light shaping and other features to support optimal illumination and image capture.

20 Claims, 4 Drawing Sheets

Related U.S. Application Data

(60) Provisional application No. 62/467,783, filed on Mar. 6, 2017.

(51) Int. Cl.
*G01B 11/24* (2006.01)
*G02B 7/02* (2006.01)

(56) References Cited

U.S. PATENT DOCUMENTS

| | | | | |
|---|---|---|---|---|
| 5,974,162 | A * | 10/1999 | Metz | G06K 7/1098 |
| | | | | 382/124 |
| 6,061,463 | A * | 5/2000 | Metz | G06K 9/00046 |
| | | | | 382/124 |
| 8,203,553 | B2 * | 6/2012 | Schwarzer | G06T 15/08 |
| | | | | 345/419 |
| 8,313,828 | B2 * | 11/2012 | Widman | B29C 39/26 |
| | | | | 428/220 |
| 8,411,140 | B2 | 4/2013 | Adelson et al. | |
| 8,813,824 | B2 * | 8/2014 | Appleby | B22C 9/22 |
| | | | | 164/369 |
| 9,127,938 | B2 | 9/2015 | Johnson et al. | |
| 9,285,531 | B2 * | 3/2016 | Sherman | G02B 6/005 |
| 9,387,533 | B1 * | 7/2016 | Heneveld | B22C 9/04 |
| 9,878,369 | B1 * | 1/2018 | Heneveld | B22C 9/02 |
| 10,228,507 | B2 * | 3/2019 | Sherman | H01H 13/83 |
| 10,426,350 | B2 * | 10/2019 | Mihailescu | A61B 8/4444 |
| 2006/0193582 | A1 * | 8/2006 | Ouderkirk | D01D 5/36 |
| | | | | 385/126 |
| 2007/0121083 | A1 * | 5/2007 | Iinuma | G03B 21/2046 |
| | | | | 353/85 |
| 2008/0297508 | A1 * | 12/2008 | Schwarzer | G06T 15/08 |
| | | | | 345/424 |
| 2009/0053351 | A1 * | 2/2009 | Widman et al. | G02C 7/04 |
| | | | | 425/174.4 |
| 2009/0174863 | A1 * | 7/2009 | Widman | B29D 11/00134 |
| | | | | 351/159.6 |
| 2010/0047380 | A1 * | 2/2010 | Widman | G02C 7/04 |
| | | | | 425/174.4 |
| 2010/0053614 | A1 * | 3/2010 | Jeys | G01N 15/1434 |
| | | | | 356/343 |
| 2010/0245761 | A1 * | 9/2010 | Widman | B29D 11/00028 |
| | | | | 351/159.41 |
| 2011/0038028 | A1 | 2/2011 | Dharmatilleke | |
| 2011/0134623 | A1 * | 6/2011 | Sherman | G02B 6/005 |
| | | | | 362/19 |
| 2011/0176325 | A1 * | 7/2011 | Sherman | G02B 6/0045 |
| | | | | 362/551 |
| 2012/0080811 | A1 * | 4/2012 | Widman | B29D 11/00144 |
| | | | | 264/1.38 |
| 2012/0171388 | A1 * | 7/2012 | Widman | B29D 11/00144 |
| | | | | 427/510 |
| 2012/0258187 | A1 * | 10/2012 | Widman | B29D 11/00144 |
| | | | | 425/174.4 |
| 2013/0139990 | A1 * | 6/2013 | Appleby | F01D 5/18 |
| | | | | 164/47 |
| 2014/0049745 | A1 * | 2/2014 | Widman | B29D 11/0073 |
| | | | | 351/159.02 |
| 2014/0104395 | A1 * | 4/2014 | Rohaly | A61B 5/1074 |
| | | | | 348/47 |
| 2014/0253717 | A1 | 9/2014 | Adelson | |
| 2014/0362239 | A1 | 12/2014 | Larson | |
| 2015/0216398 | A1 * | 8/2015 | Yang | G01J 3/0208 |
| | | | | 600/109 |
| 2016/0044218 | A1 | 2/2016 | Adelson et al. | |
| 2017/0227702 | A1 * | 8/2017 | Sherman | G02B 6/0018 |
| 2020/0012067 | A1 * | 1/2020 | Rohaly | H04N 5/2254 |

FOREIGN PATENT DOCUMENTS

| | | |
|---|---|---|
| WO | WO-2013016729 | 1/2013 |
| WO | WO-2015176183 | 11/2015 |
| WO | WO-2015176183 A1 * | 11/2015 |
| WO | WO-2018165206 | 9/2018 |

OTHER PUBLICATIONS

FIIP, "RU Application No. 2019131376 Office Action and Search Report dated Aug. 21, 2020", 14 pages.

ISA, "PCT Application No. PCT/US18/21217 International Search Report and Written Opinion dated May 15, 2018", 6 pages.

Adelson, Edward H. et al., "Visualizing and measuring detailed shape and texture with an elastomeric sensor", Imaging and Applied Optics Technical Digest 2011 OSA, Jul. 10, 2011, 3 pages.

EPO, "U.S. Appl. No. 18764114.7 Search Report dated Oct. 30, 2020", 6 pages.

USPTO, "U.S. Appl. No. 16/491,032 Non-Final Office Action dated Dec. 15, 2020", 14 pages.

CNIPA, "CN Application No. 201880030040.7 Office Action dated Dec. 3, 2020", English and Chinese Translations, 14 pages.

* cited by examiner

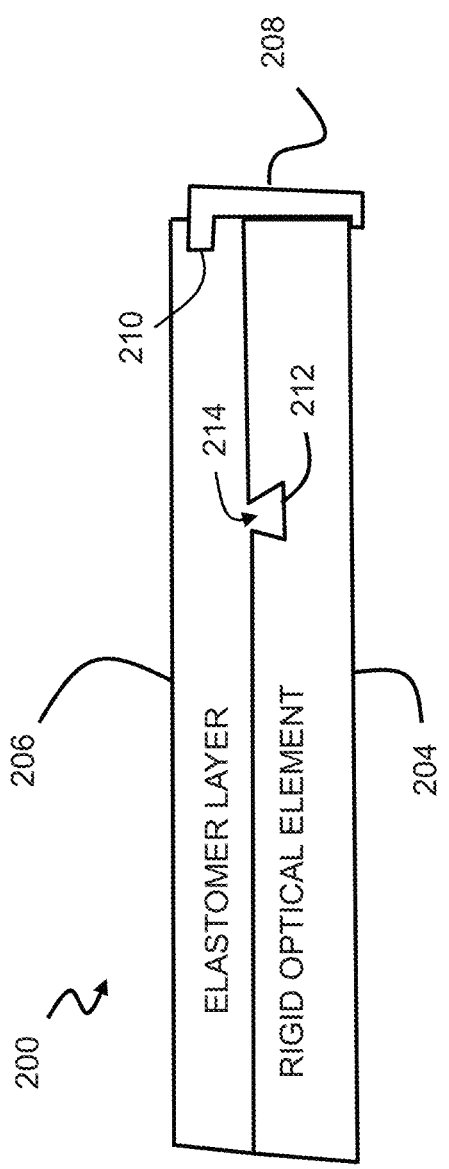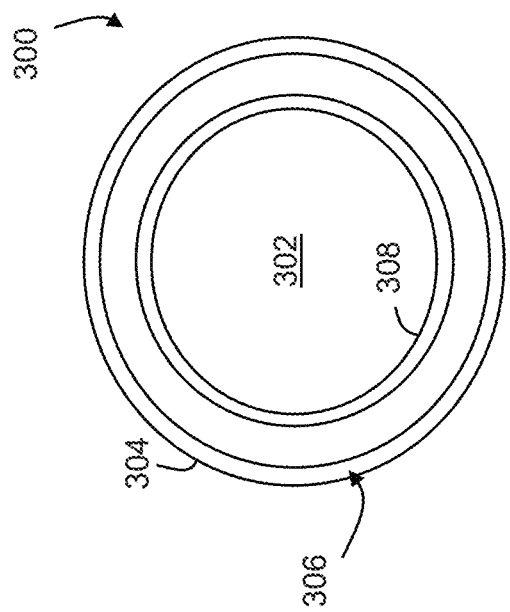

SURFACE TOPOGRAPHY MEASUREMENT SYSTEMS

CROSS-REFERENCE TO RELATED APPLICATIONS

This application is a continuation filed under 35 U.S.C. § 111(a) that claims priority under 35 U.S.C. § 120 and § 365(c) to International Patent Application No. PCT/US18/21217 filed on Mar. 6, 2018, which claims priority to U.S. Prov. App. No. 62/467,783 filed on Mar. 6, 2017, where the entire contents of each of the foregoing are incorporated herein by reference. This application is also a continuation of U.S. patent app. Ser. No. 16/491,032 filed on Sep. 4, 2019, which is a national stage entry application of International Patent Application No. PCT/US18/21217 filed on Mar. 6, 2018, which claims priority to U.S. Prov. App. No. 62/467,783 filed on Mar. 6, 2017.

TECHNICAL FIELD

The present disclosure generally relates to improvements for surface topography measurement systems that use a clear elastomer with a reflective coating to capture topographical images of a target surface, and more specifically to a removable cartridge for use with such systems.

BACKGROUND

One type of high-resolution system for measuring surface topography uses a clear elastomer with a reflective coating disposed on a rigid optical substrate. While such systems usefully permit many types of accurate, detailed surface measurements, the elastomer can delaminate and become damaged over the course of multiple uses. At the same time, replacing the elastomer is error prone, and can be challenging for end users of such systems. There remains a need for improved surface topography measurement systems that facilitate rapid and convenient elastomer changes by end users.

SUMMARY

A topographical measurement system uses an imaging cartridge formed of a rigid optical element and a clear, elastomeric sensing surface configured to capture high-resolution topographical data from a measurement surface. The imaging cartridge may be configured as a removable cartridge for the system so that the imaging cartridge, including the rigid optical element and elastomeric sensing surface can be removed and replaced as a single, integral component that is robust and stable over multiple uses, and easily replaceable by end users. The cartridge may also usefully incorporate a number of light shaping and other features to support optimal illumination and image capture.

In one aspect, a device disclosed herein includes an optical element having an interior including a rigid, optically transparent material, a first surface of the optical element, the first surface including a region with an optically transparent surface for capturing images through the optical element, a second surface of the optical element opposing the first surface, a center axis of the optical element passing through the first surface and the second surface, a layer of optically transparent elastomer disposed on the second surface and attached to the second surface, a first side of the layer adjacent to the second surface of the optical element having a second index of refraction matched to a first index of refraction of the second surface, and a second side of the layer opposing the second surface of the optical element having an optical coating with a predetermined reflectance, a sidewall around the interior of the optical element between the first surface to the second surface, the sidewall including one or more light shaping features configured to control an illumination of the second surface through the sidewall, and a mechanical key on an exterior of the optical element for enforcing a predetermined position of the optical element within a fixture of an imaging system, the mechanical key including at least one radially asymmetric feature about the center axis for enforcing a unique rotational orientation of the optical element within the fixture of the imaging system.

The mechanical key may include one or more magnets. The mechanical key may include a plurality of protrusions including at least one protrusion having a different shape than other ones of the plurality of protrusions for enforcing the unique rotational orientation of the optical element within the fixture of the imaging system. The mechanical key may include three protrusions shaped and sized to form a kinematic coupling with the fixture of the imaging system. The mechanical key may include a flange. The mechanical key may include a dovetail. The sidewall may include a continuous surface forming a frustoconical shape with the first surface and the second surface. The sidewall may include a continuous surface forming a truncated hemisphere with the first surface and the second surface. The sidewall may include two or more discrete planar surfaces. The one or more light shaping features may include a diffusing surface to diffuse point sources of incoming light along the sidewall. The one or more light shaping features may include a polished surface to refract incoming light. The one or more light shaping features may include a curved surface to focus incident light. The one or more light shaping features may include a neutral density filter with graduated attenuation to compensate for a distance from the sidewall on the second surface. The one or more light shaping features may include one or more color filters. The one or more light shaping features may include a non-normal angle of the sidewall to the second surface. The one or more light shaping features may include a geometric feature. The one or more light shaping features may include an optical film. The one or more light shaping features may include a micro-lens array. The one or more light shaping features may include a plurality of micro-replicated optical features. The layer of optically transparent elastomer may be attached to the second surface through a retaining structure. The retaining structure may include an index-matched optical adhesive disposed between the layer of optically transparent elastomer and the second surface of the optical element. The retaining structure may include a retaining ring about a perimeter of the layer of optically transparent elastomer mechanically securing the perimeter to the second surface. The retaining structure may include a recess within the second surface of the optical element and a corresponding protrusion in the first side of the layer of optically transparent elastomer that extend into the recess. The recess may include a groove. The recess may be dovetailed to provide a wider region away from the second surface. The optically transparent elastomer may be liquid-formed into the recess. The optically transparent elastomer may be thermoformed into the recess. The second surface of the optical element may include a convex curved surface extending from the optical element. The second side of the layer of optically transparent elastomer may include a convex curved surface extending away from the optical element. The rigid, optically transparent material may include at least one of a glass, a polycarbonate, and an acrylic. The device may further include one or more magnets to secure the device in the fixture of the imaging system. The imaging system may include a camera and one or more light sources in a predetermined geometric configuration relative to the fixture. The device may further include a robotic system configured to automatically remove the device from the fixture of the imaging system. The robotic system may be further configured to insert a second device into the fixture of the imaging system. The robotic system may include at least one magnet. The robotic system may include an electromechanical latch. The first surface may include a curved surface providing lens to optically magnify an image from the second surface for the imaging system. The first surface may include an aspheric surface shaped to address optical aberrations in an image captured through the optical element from the second surface. The first surface may include a freeform surface shaped to mitigate geometric distortion in an image captured through the optical element from the second surface.

BRIEF DESCRIPTION OF THE DRAWINGS

Embodiments of devices, systems, and methods described herein are shown in the following drawings. The drawings are not necessarily to scale, emphasis instead being placed upon illustrating the principles of this disclosure.

FIG. 2 shows a cross-section of an imaging cartridge for an imaging system.

FIG. 3 shows a top view of an imaging cartridge.

DETAILED DESCRIPTION

All documents mentioned herein are incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

The devices, systems, and methods described herein may include, or may be used in conjunction with, the teachings of U.S. patent application Ser. No. 14/201,835 filed on Mar. 8, 2014, U.S. Pat. No. 9,127,938 granted on Sep. 8, 2015, and U.S. Pat. No. 8,411,140 granted on Apr. 2, 2013. The entire contents of each of the foregoing is hereby incorporated by reference. In certain aspects, the devices, systems, and methods described herein may be used to provide readily interchangeable imaging cartridges for handheld or quantitative topographical or three-dimensional measurement systems. However, the devices, systems, and methods described herein may also or instead be included on, or otherwise used with, other systems. For example, the systems described herein may useful for, e.g., robotic end effector systems, such as for part identification and pose estimation, force feedback, robotic surgery, medical examination, and the like as well as other systems and applications where one or more of touch, tactile sensing, surface topography, or three-dimensional measurements are necessary or helpful.

Figure 1:
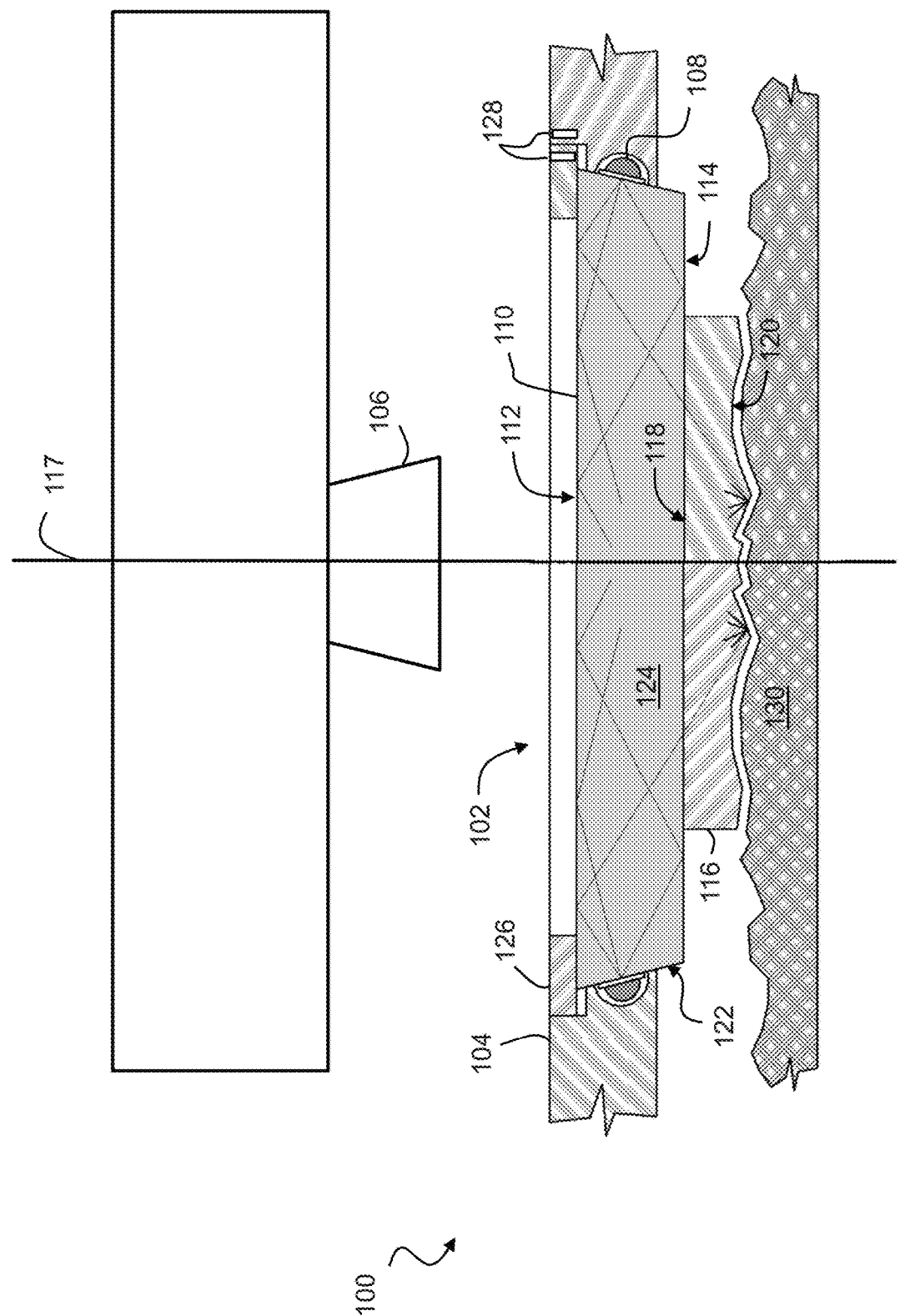
FIG. 1 shows an imaging system.

FIG. 1 shows an imaging system. In general, the imaging system 100 may be any system for quantitative or qualitative topographical measurements, such as any of those described in the documents identified above. The imaging system 100 may include an imaging cartridge 102 configured as a removable and replaceable cartridge for the imaging system 100, along with a fixture 104 for retaining the imaging cartridge 102. The fixture 104 may have a predetermined geometric configuration relative to the imaging system 100, e.g., relative to an imaging device 106 such as a camera and an illumination source 108 such as one or more light emitting diodes or other light sources, so that the imaging cartridge 102, when secured in the fixture 104, has a known position and orientation relative to the camera and light source(s). This enforced geometry advantageously permits re-use of calibration data for an imaging cartridge 102, and reliable, repeatable positioning of the imaging cartridge 102 within an optical train of the imaging system 100.

The imaging cartridge 102 may include an optical element 110 formed at least in part of a rigid, optically transparent material such as glass, polycarbonate, acrylic, polystyrene, polyurethane, an optically transparent epoxy, and so forth. A silicone may also be used, such as a hard platinum cured silicone. As a further advantage, the layer 116 of optically transparent elastomer may be formed from a soft platinum cured silicone and bonded to the hard silicone without the use of adhesives. Thus, in one aspect, the optical element 110 and the layer 116 may be formed of materials that facilitate direct bonding without any use of adhesives. The optical element 110 may include a first surface 112 including a region with an optically transparent surface for capturing images through the optical element 110, e.g., by the imaging device 106. The optical element 110 may also include a second surface 114 opposing the first surface 112, with a center axis 117 passing through the first surface 112 and the second surface 114.

In general, the first surface 112 may have optical properties suitable for conveying an image from the second surface 114 through the optical element 110 to the imaging device 106. To support this function, the first surface 112 may, for example, include a curved surface providing a lens to optically magnify an image from the second surface 114. In another aspect, the first surface 112 may include an aspheric surface shaped to address spherical aberrations or other optical aberrations in an image captured through the optical element 110 from the second surface 114. The first surface 112 may also or instead include a freeform surface shaped to reduce or otherwise mitigate geometric distortion in an image captured through the optical element 110. Imaging through a thick media may generally lead to spherical aberration with a magnitude depending on a numerical aperture of the imaging system 100 (or more specifically here, the optical element 110). Thus, the first surface 112 of the optical element 110 may be curved or otherwise adapted to address such spherical aberrations resulting from image propagation through thick media. More generally, the first surface 112 may include any shape or surface treatment suitable to focus, shape, or modify the image in a manner that supports capture of topographical data using the optical element 110. The second surface 114 may also or instead be modified to improve image capture. For example, the second surface 114 of the optical element 110 may include a convex surface extending from the optical element 110 (e.g., toward the target surface 130 being imaged) in order to magnify or otherwise shape an image conveyed from the target surface 130 to the imaging device 106.

The optical element 110 may generally serve a number of purposes in an imaging system 100 as contemplated herein. In one aspect, the optical element 110 serves as a rigid body to transfer pressure relatively uniformly across a target surface 130 when capturing images. Specifically, the body of the optical element 110 may apply a substantially uniform pressure on a clear substrate gel such that a reflective membrane coating on the other side of the clear substrate conforms to the measured surface topography. The optical element 110 may also or instead provide directional dark field illumination. To this end, sufficiently thick optical material may function as a light guide to provide controlled, uniform, and close to collimated dark field illumination of the reflective membrane surface from distinct directions (e.g., when one LED segment of the illumination source 108 is on) or from all around (e.g., when all LED segments of the illumination source 108 are on).

A layer 116 of optically transparent elastomer may be disposed on the second surface 114 and attached to the second surface 114 using any suitable means, such as any of those described herein. In general, the layer 116 may be formed of a gel or other relatively pliable material that is capable of deforming to match a topography of a target surface 130 so that the complementary shape formed in the layer 116 can be optically captured through an opposing surface of the layer 116. In terms of pliability, an elastomer with a Shore OO durometer value of about 5-60 may usefully serve as the layer 116 contemplated herein. In general, a first side 118 of the layer 116 that is adjacent to the second surface 114 of the optical element 110 may have an index of refraction that is matched to the index of refraction of the second surface 114. It will be appreciated that, as used herein when referring to indices of refraction, the term "matched" does not require identical indices of refraction. Instead, the term "matched" generally means having indices of refraction that are sufficiently close to transmit images through a corresponding interface between two materials for capture by the imaging device 106. Thus, for example, acrylic has an index of refraction of about 1.49 while polydimethylsiloxane has an index of refraction of about 1.41 and these materials are sufficiently matched that they can be placed adjacent to one another and can be used to transmit images sufficient for quantitative or qualitative topographical measurements as contemplated herein.

A second side 120 of the layer 116 may be configured to conform to a target surface 130 while providing a surface facing the imaging device 106 that facilitates topographical imaging and measurements by the imaging system 100. The second side 120 may, for example, include an opaque coating, or more generally, any optical coating with a predetermined reflectance suitable for supporting topographical imaging as contemplated herein. In general, this coating can facilitate capture of images through the optical element 110 that are independent of optical properties of the target surface 130 such as color, translucence, gloss, specularity, and the like that might otherwise interfere with optical imaging. In one aspect, the second side 120 may include a convex surface extending away from the optical element 110 (e.g., toward the target surface 130). This geometric configuration can provide numerous advantages such as facilitating imaging of surfaces with large, aggregate concave shapes, and mitigating an accumulation of air bubbles within the field of view when the imaging cartridge 102 is initially placed in contact with a target surface 130.

A sidewall 122 may be formed around an interior 124 of the optical element 110 extending from the first surface 112 to the second surface 114. In general, the sidewall 122 may include one or more light shaping features configured to control an illumination of the second surface 114 through the sidewall 122, e.g., from the illumination source 108. The sidewall 122 may assume a variety of geometries with useful light shaping features, e.g., to steer light at desirable angles and uniformity into and through the optical element 110. For example, the sidewall 122 may include a continuous surface forming a frustoconical shape between two circles formed in the first surface 112 and the second surface 114. The sidewall 122 may also or instead include a truncated hemisphere between some or all of the region between the first surface 112 and the second surface 114. In another aspect, the sidewall 122 may include two or more discrete planar surfaces arranged into a regular or irregular polygonal geometry such as a hexagon or an octagon about the center axis 117. In this later embodiment with planar surfaces, each such surface may have an illumination source 108 such as one or more light emitting diodes adjacent thereto in order to provide side lighting as desired through the optical element 110.

Other light shaping features may also or instead be used with the sidewall 122, e.g., to focus or steer incident light from the illumination source 108, or to control reflection of light within the optical element 110 and/or the layer 116 of optically transparent elastomer. For example, the light shaping feature may include a diffusing surface to diffuse point sources of incoming light along the sidewall 122. This may, for example, help to diffuse light from individual light emitting diode elements in the illumination source 108, and/or to provide a more uniform illumination field from a planar surface of the sidewall 122. The sidewall 122 may also or instead include a polished surface to refract incoming light into the optical element 110. It will be appreciated that diffusing and reflecting surfaces may also be used in various combinations to generally shape illumination within the optical element 110. The sidewall 122 may also or instead include a curved surface, e.g., forming a lens within the sidewall 122 to focus or steer incident light into the optical element 110 as desired.

In another aspect, the sidewall 122 may include a neutral density filter with graduated attenuation to compensate for a distance from the sidewall 122. More specifically, in order to avoid over-illumination of regions of the second surface 118 near the sidewall 122, and/or under-illumination of regions of the second surface 118 away from the sidewall 122 (and closer to the center axis 117), the sidewall 122 may provide broadband attenuation with a neutral density filter that provides greater attenuation in areas of the sidewall 122 closer to the second surface 114 and less attenuation in areas of the sidewall 122 closer to the first surface 112. In this manner, light rays directly illuminating the second surface 114 at a downward angle adjacent to the sidewall 122 may be more attenuated than other light rays exiting the illumination source 108 toward the center of the second surface 114. This attenuation may, for example, be continuous, discrete, or otherwise graduated to provide generally greater attenuation closer to the sidewall 122 or otherwise balance illumination within the field of view.

In another aspect, the light shaping feature may include one or more color filters, which may usefully be employed, e.g., to correlate particular colors to particular directions of illumination within the optical element 110, or otherwise control use of colored illumination from the illumination source 108. In another aspect, the light shaping feature may include a non-normal angle of the sidewall 122 to the second surface 114. For example, as illustrate in FIG. 1, the sidewall 122 is angled away from the second surface 114 to form an obtuse angle therewith. This approach may advantageously support indirect illumination of the second surface 118, e.g. by reflecting light off of the first surface 112 and into the optical element 110. In another aspect, the sidewall 122 may be angled toward the second surface to provide an acute angle therewith, e.g., in order to support greater direct illumination of the second surface 118. These approaches may be used alone or in combination to steer light as desired into and through the optical element 110.

The light shaping feature may also or instead include a geometric feature such as a focusing lens, planar regions, or the like to direct incident light as desired. Other optical elements may also or instead usefully be formed onto or into the sidewall 122. For example, the light shaping feature may include an optical film such as any of a variety of commercially available films for filtering, attenuating, polarizing or otherwise shaping the incident light. The light shaping feature may also or instead include a micro-lens array or the like to steer or focus incident light from the illumination source 108. The light shaping feature may also or instead include a plurality of micro-replicated and/or diffractive optical features such as lenses, gratings, or the like. For example, a microstructured sidewall 122 may include, e.g., microimaging lenses, lenticulars, microprisms, and so on as light shaping features to steer light from the illumination source 108 into the optical element 110 in a manner that improves imaging of topographical variations to the imaging surface of the imaging cartridge 102 on the second side 120 of the layer 116 of optically transparent elastomer. For example, microstructured features may facilitate shaping the illumination pattern to provide uniform light distribution across the measured field, reduce the reflection of light back into or out of the optical element 110, and so forth. Microstructuring may, for example, be imposed during injection molding of the optical element 110, or by applying an optical film with the desired microstructure to the side surface. For example, a commercially suitable optical film includes Vikuiti™, an advanced light control film (ALCF) sold by 3M.

A mechanical key 126 may be disposed on an exterior of the optical element 110 for enforcing a predetermined position of the optical element 110 (and more generally, the imaging cartridge 102) within the fixture 104 of the imaging system 100. The mechanical key 126 may, for example, include at least one radially asymmetric feature about the center axis 117 for enforcing a unique rotational orientation of the optical element 110 within the fixture 104 of the imaging system 100. The mechanical key 126 may include any number of mechanical elements or the like suitable for retaining the optical element 110 in a predetermined orientation within the imaging system 100. The mechanical key 126 may also or instead include a matched geometry between the optical element 110 and the fixture 104. For example, the mechanical key 126 may include a cylindrical structure extending from the optical element 110, or an elliptical prism or the like, which may usefully enforce a rotational orientation concurrently with position.

In one aspect, the mechanical key 126 may include one or more magnets 128, which may secure the optical element 110 in the fixture 104 of the imaging system. The magnets 128 may be further encoded via positioning and/or polarity to ensure that the optical element 110 is only inserted in a particular rotational orientation about the center axis 117. The mechanical key 126 may also or instead include a plurality of protrusions including at least one protrusion having a different shape than other ones of the plurality of protrusions for enforcing the unique rotational orientation of the optical element 110 about the center axis 117 within the fixture 104 of the imaging system 100. The mechanical key 126 may also or instead include at least three protrusions (e.g., exactly three protrusions) shaped and sized to form a kinematic coupling with the fixture 104 of the imaging system 100. The mechanical key 126 may also or instead include features such as a flange, a dovetail, or any other mechanical shapes or features to securely mate the optical element 110 to the fixture 104 in a predetermined position and/or orientation. A number of specific mechanical keying systems are discussed herein with reference to specific optical element designs and configurations.

Surfaces of the imaging cartridge 102 may be further treated as necessary or helpful for use in an imaging system 100 as contemplated herein. For example, regions of the top, side, and bottom surfaces of the optical element 110 or other portions of the imaging cartridge 102 may be covered with a light absorbing layer, such as a black paint, e.g., to contain light from the illumination source 108 or to reduce infiltration of ambient light.

One challenge to securing a flexible elastomer (in the layer 116) to a rigid surface such as the optical element 110 may be delamination, which can result from shear forces and other edge effects after repeated image capture, particularly where the target surface 130 tends to adhere to the elastomer. To address this issue, the optical element 110 and the layer 116 of clear elastomer may be formed as a cartridge that is provided for end users as an integral, removable and replaceable device. This cartridge can be quickly and easily replaced by an end user as required, or in order to substitute in an imaging cartridge 102 with different optical properties, e.g., for a different imaging application, resolution, or the like. At the same time, concurrent replacement of the optical element 110 with the layer 116 permits the use of more robust means for mechanically securing the layer 116 of elastomer to the optical element 110. As a significant advantage, this approach can mitigate challenges to the end user associated with exchanging the layer 116 of elastomer, such as the introduction of contaminants or air bubbles between the layer 116 of elastomer and the optical element 110.

FIG. 2 shows a cross-section of an imaging cartridge for an imaging system. In general, the imaging cartridge 200 may include a layer 206 of optically transparent elastomer coupled to an optical element 204. This may include any of the layers of elastomer and optical elements described herein. In general, the layer 206 of elastomer may be coupled to the optical element 204 using any suitable retaining structure. Because the layer of elastomer and the optical element 204 are provided to end users as an integrated cartridge, as distinguished from similar systems of the prior art, which required periodic manual replacement of the layer 206 of elastomer, a wider variety and combination of techniques may be used to securely retain the layer 206 adjacent to the optical element 204.

The retaining structure may include any tackifier or other adhesive, glue, epoxy, or the like, including any of the adhesives described herein. Where the imaging cartridge 200 is fabricated for use as an integral, consumable product, it should not generally be necessary to remove and replace the layer 206 of elastomer, and the layer 206 may be affixed to the optical element 204 with a relatively strong, rigid epoxy. In one aspect, the retaining structure may include an index-matched optical adhesive disposed between the layer 206 of optically transparent elastomer and the surface of the optical element 204. As discussed above, index-matched in this context refers to any indices of refraction sufficiently close to support optical transmission of a useful image across the corresponding interface.

The retaining structure may also include a retaining ring 208 about a perimeter of the layer 206 of optically transparent elastomer mechanically securing the perimeter to the surface of the optical element 204. The retaining ring 208 may traverse the entire perimeter or one or more portions of the perimeter. While the retaining ring 208 may optionally extend over a top, functional surface of the layer 206 of elastomer, this may interfere with placement of the imaging cartridge 200 on a target surface, particularly if the target surface is substantially planar. Thus, in one aspect, the retaining ring 208 may usefully be positioned within an indent 210 or the like formed within an edge of the layer 206, or an indent 210 created by a mechanical force of the retaining ring 208 against the more pliable elastomer of the layer 206. It will be appreciated that the retaining ring 208 may have any shape, corresponding generally to a shape of a perimeter of the layer 206 of elastomer such as a polygon, ellipse, and so forth. Thus, the term "ring" as used in this context, is not intended to suggest or require a circular or rounded shape. Further, while a retaining ring 208 is described, the retaining structure may also or instead include any number of tabs, protrusions, flanges, or the like extending over or into the layer 206 to mechanically secure the perimeter of the layer 206 in contact with the optical element 204.

The retaining structure may also or instead include a recess 212 within the surface of the optical element, and a corresponding protrusion 214 in the layer 206 of optically transparent elastomer that extends into the recess 212. The recess 212 may include a groove or other shape suitable for receiving the protrusion 214. In one aspect, the recess 212 may be dovetailed to provide a wider region away from the surface of the layer 206 in order to improve the mechanical strength of the bond formed between the layer 206 of elastomer and the optical element 204. More generally, the recess 212 may be structurally configured to retain the layer 206 on the surface of the optical element 204. In this manner, a mechanical coupling may be formed between the layer 206 and the optical element 204, e.g., to replace or augment a coupling formed by adhesives, a retaining ring 208, or any other retaining structures.

In order to fill the recess 212 during manufacturing, the layer 206 of elastomer may be liquid-formed or thermoformed into the recess 212 using any suitable, optically transparent elastomer. Suitably shaped, deformable elastomers may also or instead be press-fit or otherwise assembled into the recess 212. However, by applying the elastomer as a liquid and then curing the elastomer, the layer 206 of elastomer may more fully fill the void space of the recess 212 and provide a stronger mechanical bond to the optical element 204.

FIG. 3 shows a top view of an imaging cartridge. The imaging cartridge 300 may be an imaging cartridge such as any of the imaging cartridges or similar components described herein. In general, the imaging cartridge 300 may include a layer 302 of a pliable elastomer used to contact and capture images of target surfaces. The layer 302 may be secured to an optical element through a variety of retaining structures such as a retaining ring 304 about a perimeter 306 of the layer 302, or a protrusion 308 formed into a recess in the optical element. In general, the imaging cartridge 300 and/or layer 302 may have any of a variety of shapes. For example, the layer 302 may include a perimeter 306 in the shape of a circle, an ellipse, a square, a rectangle, or any other polygon or other shape.

A variety of imaging cartridges incorporating features described herein will now be described.

Figure 4:
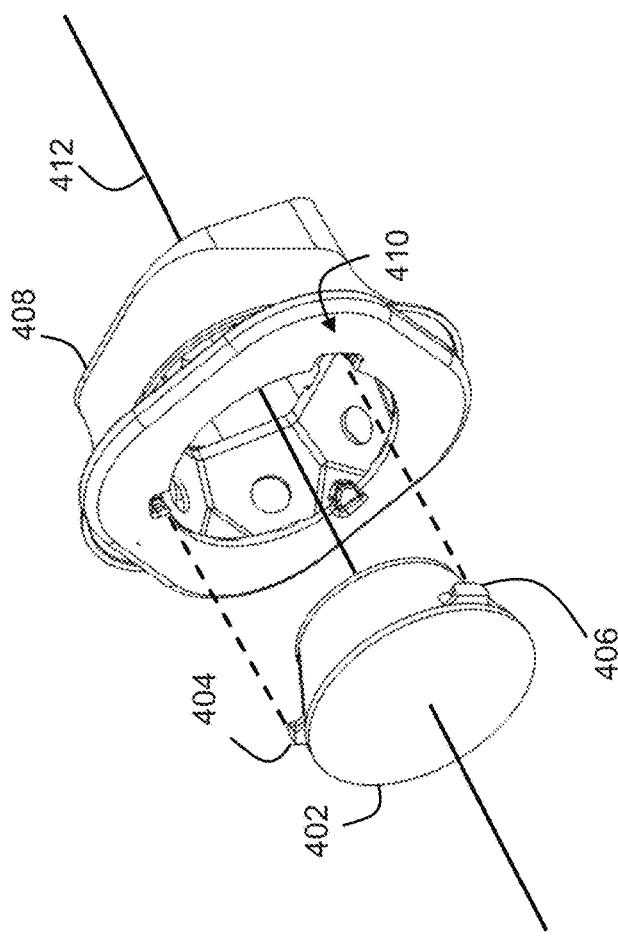
FIG. 4 is a perspective view of an optical element and a housing for an imaging system.

FIG. 4 is a perspective view of an optical element and a housing for an imaging system. The optical element 402 may, for example, be any of the optical elements 402 described herein. In general, the optical element 402 may include a number of protrusions 404, 406, which may be axially asymmetric in order to enforce a unique radial orientation within the housing 408. For example, one protrusion 406 may be larger than the other protrusions 404 in order to provide radial keying, or the protrusions 406 may be irregularly spaced in a manner that enforces a unique radial orientation, or some combination of these. The housing 408 may include a number of slots 410 or the like to receive the protrusions 406, 408, after which the optical element 402 may be rotated about an axis 412 of the imaging system 400 so that the protrusions 406, 408 securely retain the optical element 402 within the housing 408. The protrusions 406, 408 may, for example, form a kinematic coupling with the slots 410 of the housing 408 to enforce a predetermined geometric orientation of the optical element 402 within the housing 408 and an associated imaging system.

Figure 5:
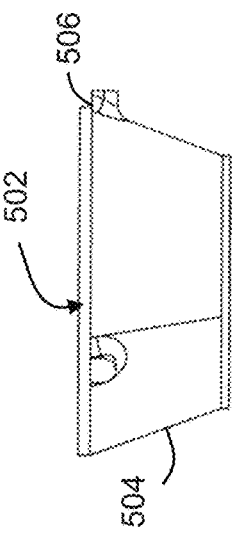
FIG. 5 is a side view of an optical element for an imaging system.

FIG. 5 is a side view of an optical element for an imaging system. It will be noted that, in the embodiment of FIG. 5, a top surface 502 of the optical element 504 extends above a number of protrusions 506 that secure the optical element 504 to a housing. This permits a layer of an elastomer to extend beyond the surface of the housing sufficiently so that the housing does not interfere with contact between the elastomeric layer and a target surface. As described above, a layer of transparent elastomer (not shown) may be affixed to the surface of the optical element 504 using any suitable techniques.

Figure 6:
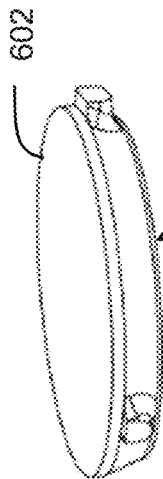
FIG. 6 is a perspective view of an optical element.

The imaging cartridge may have a variety of different shapes, and may usefully share a mounting interface such as protrusions so that different types of imaging cartridges can be used within the same housing for different imaging applications. FIG. 6 is a perspective view of an optical element 602 having a low profile. The optical element 602 may be shaped and sized to fit securely within a housing such as the housing 408 of FIG. 4, but may be thinner, e.g., to reduce optical aberrations in images captured through the optical element 602 or to facilitate the use of additional optical elements such as filters, imaging lenses, and the like between the optical element 602 and a camera or other imaging device of an imaging system. This profile can also advantageously accommodate lighting through the surface 604 facing a camera (and opposing an elastomer layer and target surface) to facilitate illumination and imaging of high-aspect negative features on the target surface such as trenches, deep grooves, and the like. In this context, the term "high-aspect" is intended to refer to features that are (or might be) occluded from illumination at grazing illumination angles of, e.g., more than forty-five degrees from the surface normal.

Figure 7:
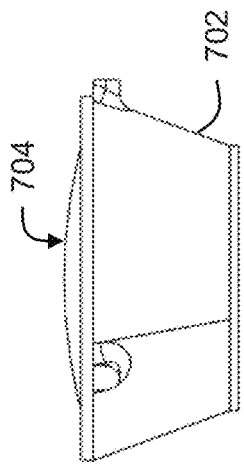
FIG. 7 is a perspective view of an optical element.

FIG. 7 is a perspective view of an optical element. The optical element 702 may include a convex surface 704 shaped to support an elastomer layer in a manner that extends away from the optical element 702, which may advantageously permit imaging of relatively concave surfaces, and may also advantageously mitigate bubble formation when the elastomer layer is placed on a target surface for image capture. The optical element 702 may be shaped and sized to fit securely within a housing such as the housing 408 of FIG. 4.

Figure 8:
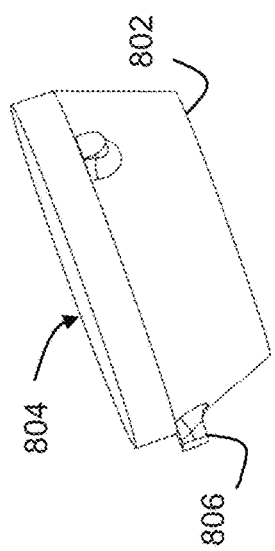
FIG. 8 is a perspective view of an optical element.

FIG. 8 is a perspective view of an optical element. The optical element 802 may usefully incorporate a high-profile contact surface 804 that extends away from the protrusions 806 of the optical element 802, e.g., to provide greater clearance between a housing and the imaging surface. The optical element 802 may be shaped and sized to fit securely within a housing such as the housing 408 of FIG. 4. In general, the foregoing optical elements may be used interchangeably with a single housing, thus facilitating different modes of operation supported by different imaging cartridge properties. Further, by providing a kinematic coupling or similarly orientation-specific mounting system, calibration results and the like for a particular optical element may be recalled and reused when a previously used optical element is once again placed within the housing.

Figure 9:
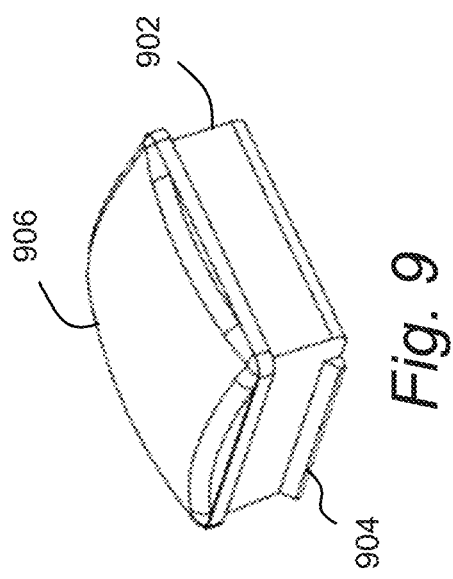
FIG. 9 is a perspective view of an optical element.
Figure 10:
FIG. 10 is a side view of the optical element of FIG. 9.

FIG. 9 is a perspective view of an optical element. The optical element 902 may, for example, have a generally rectangular construction, and may include one or more flanges 904 or the like so that the optical element 902 can linearly slide into engagement with a fixture of a housing. This type of engagement mechanism may be particularly suited to robotic applications or the like, such as where the optical element 902 is removed from and replaced to an end effector of a robotic arm. The optical element 902 may, for example, be any of the optical elements described herein, with corresponding surface and sidewall properties. A layer 906, such as any of the layers of optically transparent elastomer described herein, may be disposed on the optical element 902 to provide a contact surface for capturing topographical images of a target surface. The layer 906 may be convex, or otherwise curved away from the optical element 902, e.g., to provide clearance from a housing and/or to mitigate formation of air bubbles when the layer 906 is placed for use on a target surface. FIG. 10 is a side view of the optical element of FIG. 9.

Figure 11:
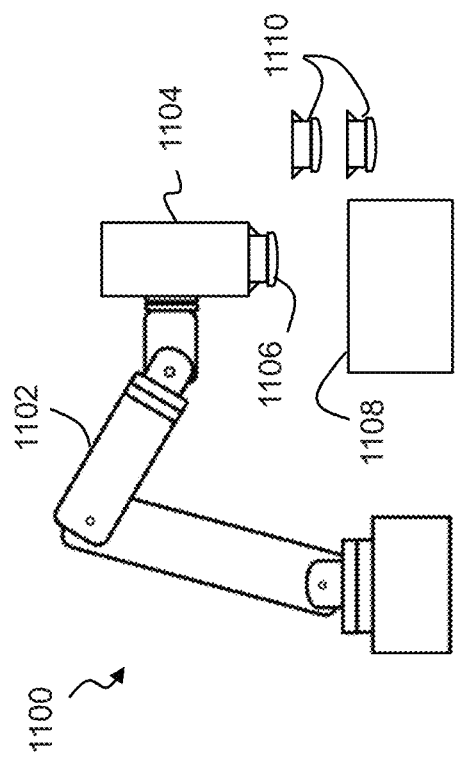
FIG. 11 shows a robotic system using an imaging cartridge.

FIG. 11 shows a robotic system using an imaging cartridge. In general, the system 1100 may include a robotic arm 1102 coupled to a housing 1104 configured to removably and replaceably receive a cartridge 1106 such as any of the imaging cartridges or other optical devices described herein. The robotic arm 1102 (or any other suitable robotic element(s)) may be configured to position the cartridge 1106 in contact with a target surface 1108 in order to capture topographical images of the target surface 1108 through the cartridge 1106 using, e.g., a camera or other imaging device in the housing 1104. In general, the system 1100 may be configured to automatically remove the cartridge 1106 from a fixture of the imaging system 1100 (e.g., in the housing 1104), and to insert a second cartridge 1110 into the housing 1104. The second cartridge 1110 may be the same as the cartridge 1106, e.g., to provide a replacement after ordinary wear and tear, or the second cartridge 1110 may have a different optical configuration than the first cartridge 1106, e.g., to provide greater magnification, a larger field of view, better feature resolution, deep feature illumination, different aggregate surface shape, different shape tolerances for the target surface 1108, and so forth. The second cartridge 1110 may be stored in a bin or other receptacle accessible to the robotic arm 1102 of the system 1100. In general, the system 1100 may include one or more magnets, electromechanical latches, actuators, and so forth, within the housing 1104, or more generally within the system 1100, to facilitate removal and replacement of the cartridge 1106 as described herein. More generally, the system 1100 may include any gripper, clamp, or other electromechanical end effector or the like suitable for removing and replacing the cartridge 1106 and positioning the cartridge 1106 for use in an imaging process.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A device comprising:
    an optical element having an interior including a rigid, optically transparent material including at least one of a glass, a polycarbonate, and an acrylic;
    a first surface of the optical element, the first surface including a region with an optically transparent surface for capturing images through the optical element;
    a second surface of the optical element opposing the first surface;
    a center axis of the optical element passing through the first surface and the second surface;
    a layer of optically transparent elastomer disposed on the second surface and attached to the second surface, a first side of the layer adjacent to the second surface of the optical element having a second index of refraction matched to a first index of refraction of the second surface, and a second side of the layer opposing the second surface of the optical element having an optical coating with a predetermined reflectance;
    a sidewall around the interior of the optical element between the first surface to the second surface, the sidewall including one or more light shaping features configured to control an illumination of the second surface through the sidewall; and
    a mechanical key on an exterior of the optical element for enforcing a predetermined position of the optical element within a fixture of an imaging system, the mechanical key including at least one radially asymmetric feature about the center axis for enforcing a unique rotational orientation of the optical element within the fixture of the imaging system.

2. The device of claim 1 wherein the mechanical key includes one or more magnets.

3. The device of claim 1 wherein the mechanical key includes a plurality of protrusions including at least one protrusion having a different shape than other ones of the plurality of protrusions for enforcing the unique rotational orientation of the optical element within the fixture of the imaging system.

4. The device of claim 1 wherein the mechanical key includes three protrusions shaped and sized to form a kinematic coupling with the fixture of the imaging system.

5. The device of claim 1 wherein the mechanical key includes a flange.

6. The device of claim 1 wherein the mechanical key includes a dovetail.

7. The device of claim 1 wherein the layer of optically transparent elastomer is attached to the second surface through a retaining structure.

8. The device of claim 7 wherein the retaining structure includes an index-matched optical adhesive disposed between the layer of optically transparent elastomer and the second surface of the optical element.

9. The device of claim 7 wherein the retaining structure includes a retaining ring about a perimeter of the layer of optically transparent elastomer mechanically securing the perimeter to the second surface.

10. The device of claim 7 wherein the retaining structure includes a recess within the second surface of the optical element and a corresponding protrusion in the first side of the layer of optically transparent elastomer that extend into the recess.

11. The device of claim 10 wherein the recess includes a groove.

12. The device of claim 10 wherein the recess is dovetailed to provide a wider region away from the second surface.

13. The device of claim 10 wherein the optically transparent elastomer is liquid-formed into the recess.

14. The device of claim 10 wherein the optically transparent elastomer is thermoformed into the recess.

15. The device of claim 1 wherein the second surface of the optical element includes a convex curved surface extending from the optical element.

16. The device of claim 1 wherein the second side of the layer of optically transparent elastomer includes a convex curved surface extending away from the optical element.

17. The device of claim 1 further comprising one or more magnets to secure the device in the fixture of the imaging system.

18. The device of claim 1 wherein the imaging system includes a camera and one or more light sources in a predetermined geometric configuration relative to the fixture.

19. The device of claim 1 further comprising a robotic system configured to automatically remove the device from the fixture of the imaging system.

20. The device of claim 19 wherein the robotic system is further configured to insert a second device into the fixture of the imaging system.

* * * * *

UNITED STATES PATENT AND TRADEMARK OFFICE
CERTIFICATE OF CORRECTION

PATENT NO. : 10,965,854 B2
APPLICATION NO. : 16/563187
DATED : March 30, 2021
INVENTOR(S) : Janos Rohaly and Edward H. Adelson It is certified that error appears in the above-identified patent and that said Letters Patent is hereby corrected as shown below:

On the Title Page

Item (63), delete:
"Continuation of application No. 16/563,187, filed on Sep. 4, 2019, which is a continuation of application No. PCT/US2018/021217, filed on Mar. 6, 2018."
And insert:
-- Continuation of application No. PCT/US2018/021217, filed on Mar. 6, 2018, and continuation of application No. 16/491,032, filed on Sep. 4, 2019, which is a national stage entry application of application No. PCT/US2018/021217, filed on Mar. 6, 2018. --

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*